United States Patent [19]

Munnerlyn

[11] Patent Number: 4,544,243
[45] Date of Patent: Oct. 1, 1985

[54] HEADS UP DISPLAY FOR MICROSCOPE USING REMOTELY CONTROLLED INSTRUMENT

[75] Inventor: Charles R. Munnerlyn, Sunnyvale, Calif.

[73] Assignee: Cooper Lasersonics, Inc., Santa Clara, Calif.

[21] Appl. No.: 613,526

[22] Filed: May 24, 1984

[51] Int. Cl.⁴ .................. G02B 21/00; G02B 27/10
[52] U.S. Cl. ........................... 350/514; 350/174; 340/705
[58] Field of Search ............ 350/507, 174, 514, 515, 350/516; 340/705

[56] References Cited

U.S. PATENT DOCUMENTS

| | | | |
|---|---|---|---|
| 2,674,152 | 4/1954 | Wilkinson | 350/507 |
| 2,769,370 | 11/1956 | Tompkins | 350/515 |
| 3,398,630 | 8/1968 | Dakin | 350/515 |
| 3,589,796 | 6/1971 | Schaefer | 350/174 |
| 4,012,123 | 3/1977 | Fuller | 350/174 |
| 4,202,037 | 5/1980 | Glaser et al. | 340/705 |

FOREIGN PATENT DOCUMENTS 1235006  2/1967  Fed. Rep. of Germany ...... 350/507

Primary Examiner—Jon W. Henry
Attorney, Agent, or Firm—C. Michael Zimmerman

[57] ABSTRACT

Information relevant to a remote instrument is made viewable within a microscope 10 by a heads up display using a beam splitter 15 arranged in a collimated light region between binoculars 12 and objective 11 of microscope 10. An electronic digital display 16 relevant to a control setting for the remote instrument is arranged off the optical axis of microscope 10 and viewed by a convex mirror 20. A folding mirror 21 directs diverging light from convex mirror 20 toward beam splitter 15, and a collimating lens 22 collimates the diverging light enroute from folding mirror 21 to beam splitter 15. Collimated light from the lens is incident on beam splitter 15 to position an image of the digital display in a marginal region of the apparent field of one of the binoculars 12.

14 Claims, 3 Drawing Figures

HEADS UP DISPLAY FOR MICROSCOPE USING REMOTELY CONTROLLED INSTRUMENT

BACKGROUND

Heads up display of information needed by a person looking through eyepieces is known to be convenient so that the viewer can get the necessary information without looking away from the viewing field. Besides eliminating the interruptive delay in moving back and forth between eyepieces and a separate meter reading, a heads up display is especially convenient for users who normally wear eyeglasses but remove them for viewing through adjusted eyepieces. Turning away from the field of view to observe a meter reading without eyeglasses can add to the delay.

Lensmeters for measuring the diopter value of eyeglasses have included a heads up display of the measured value derived from an engraved scale built into the instrument and lighted so that its reading is imaged in the apparent field of view. The engraving can be made small enough to make the numbers occupy a reasonably small portion of the apparent field.

For instruments that are controlled remotely from a microscope, an optomechanical engraving showing a control setting is not practical. Microsurgery accomplished with a microscope and a surgical laser presents this problem. Laser control settings must be viewed by the surgeon who is otherwise occupied with the surgical field of view available through microscope eyepieces. A heads up display of laser control settings within the apparent field of view of the microscope would be very convenient to the surgeon, but practical problems have stood in the way of a solution.

For example, an electronic digital display of numbers relevant to a control setting for a remote instrument cannot be imaged directly within the apparent field of a microscope binocular without consuming too much space. Even the small LED's used in hand-held calculators would fill more than half the apparent field of view if as few as three digits were directly displayed. Optically halving the image size of a small LED compatibly with binocular objectives having focal lengths ranging from 100 to 125 millimeters would require a collimating lens with a focal length of around 200 millimeters. A heads up display containing a lens with a 200 millimeter focal length would make the microscope unwieldy and interfere with the reach of the surgeon, even if the path were folded in half.

I have devised a compact and effective way of displaying control information from a remote instrument within the apparent field of view of a microscope so that the displayed information is suitably sized and positioned, and the system is compactly fitted within conventional microscopes. My system uses a beam splitter positioned in the essentially collimated light region between a microscope objective and image viewing binoculars, and I dispose a heads up display system adjacent the beam splitter where it does not take space away from the person using the microscope. My heads up display aims at convenience, compactness, efficiency, and reliability in presenting information from a remotely controlled instrument to the user of a microscope.

SUMMARY OF THE INVENTION

My heads up display presents information relevant to a remote instrument used in association with a microscope having a microscope objective, binoculars, and an essentially collimated light region between the microscope objective and the binoculars. Here I use a beam splitter, and preferably next to that I arrange an electronic digital display relevant to a control setting for the remote instrument. A convex mirror views the digital display, and a folding mirror directs diverging light from the convex mirror toward the beam splitter. A collimating lens collimates diverging light enroute from the folding mirror to the beam splitter, and collimated light from the lens is incident on the beam splitter to position an image of the digital display in a marginal region of the apparent field of one of the binoculars of the microscope. Preferably a pair of digital displays are spaced apart and oriented so that both are viewed by the convex mirror. Then the folding mirror can be arranged between the digital displays to dispose the display images at opposite top and bottom marginal regions of the apparent field of a binocular.

DRAWINGS

FIGS. 1 and 2 are respective right and left side schematic views of a preferred embodiment of a microscope embodying my heads up display; and FIG. 3 is a schematic front view of the heads up display of FIGS. 1 and 2 showing the displayed information in the apparent field of the left binocular of the microscope.

DETAILED DESCRIPTION

Figure 1:
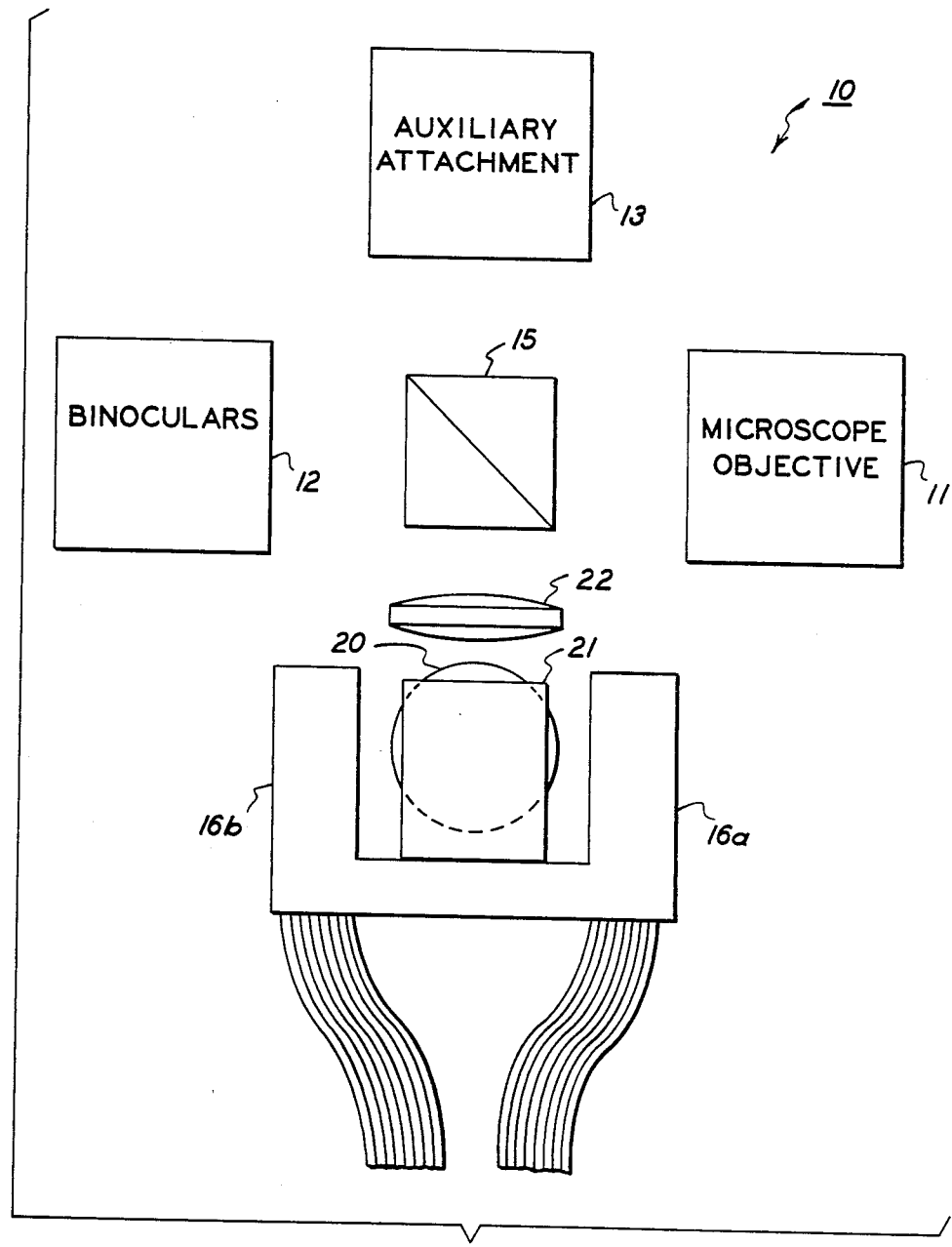
Figure 2:
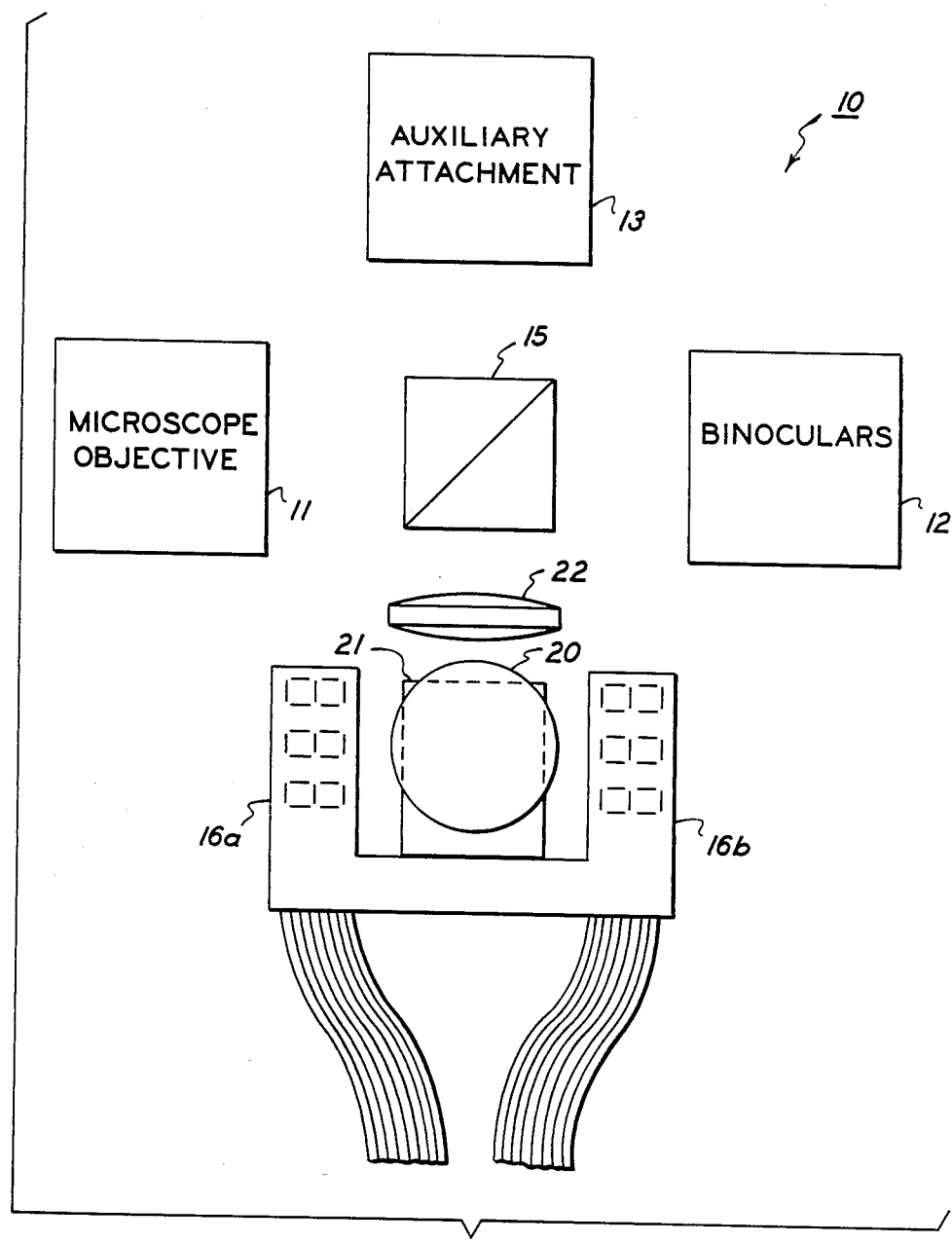

My heads up display is for use with a microscope 10, some of the components of which are schematically shown in the drawings. These include microscope objective 11 for forming an image of a site and binoculars 12 for viewing the image formed by objective 11. Binoculars 12 include eyepieces and binocular objectives for receiving parallel image light achieved by collimating light passing from microscope objective 11 to binoculars 12. Beam splitter 15 is arranged in this region and can be present in existing microscopes for auxiliary attachments 13 to accommodate an additional viewer or a mount for a photographic or video camera, as is generally known. If beam splitter 15 is not already present for an auxiliary attachment 13, I add beam splitter 15 along with other components for introducing images for my heads up display.

A pair of control information displays 16a and 16b can be formed by electronically driven devices such as the small LED's used in pocket calculators. These provide numbers relevant to control settings for a remote instrument used in association with microscope 10. Such a remotely controlled instrument can be a laser used in microsurgery, but other remote instruments having control settings to be made visible along with a site viewed by the microscope are also possible. Moreover, single and multiple numbers of different digit lengths and alphanumeric information can be used in my heads up display.

To reduce the image size of digital displays 16a and 16b, I arrange a convex mirror 20 for viewing both displays 16a and b and diverging the light from displays 16 so that they appear to recede from the viewer and diminish in size. A suitable radius of curvature for mirror 20 is 12.5 millimeters.

A flat folding mirror 21, preferably positioned between digital displays 16a and 16b, reflects diverging light from convex mirror 20 upward toward the bottom of beam splitter 15. A collimating lens 22 collimates the diverging light enroute from mirror 21 to beam splitter 15, which reflects a portion of the heads up display light to binoculars 12 and can also transmit another portion through to auxiliary attachment 13. Collimating lens 22 can have a focal length of 50 millimeters.

Figure 3:
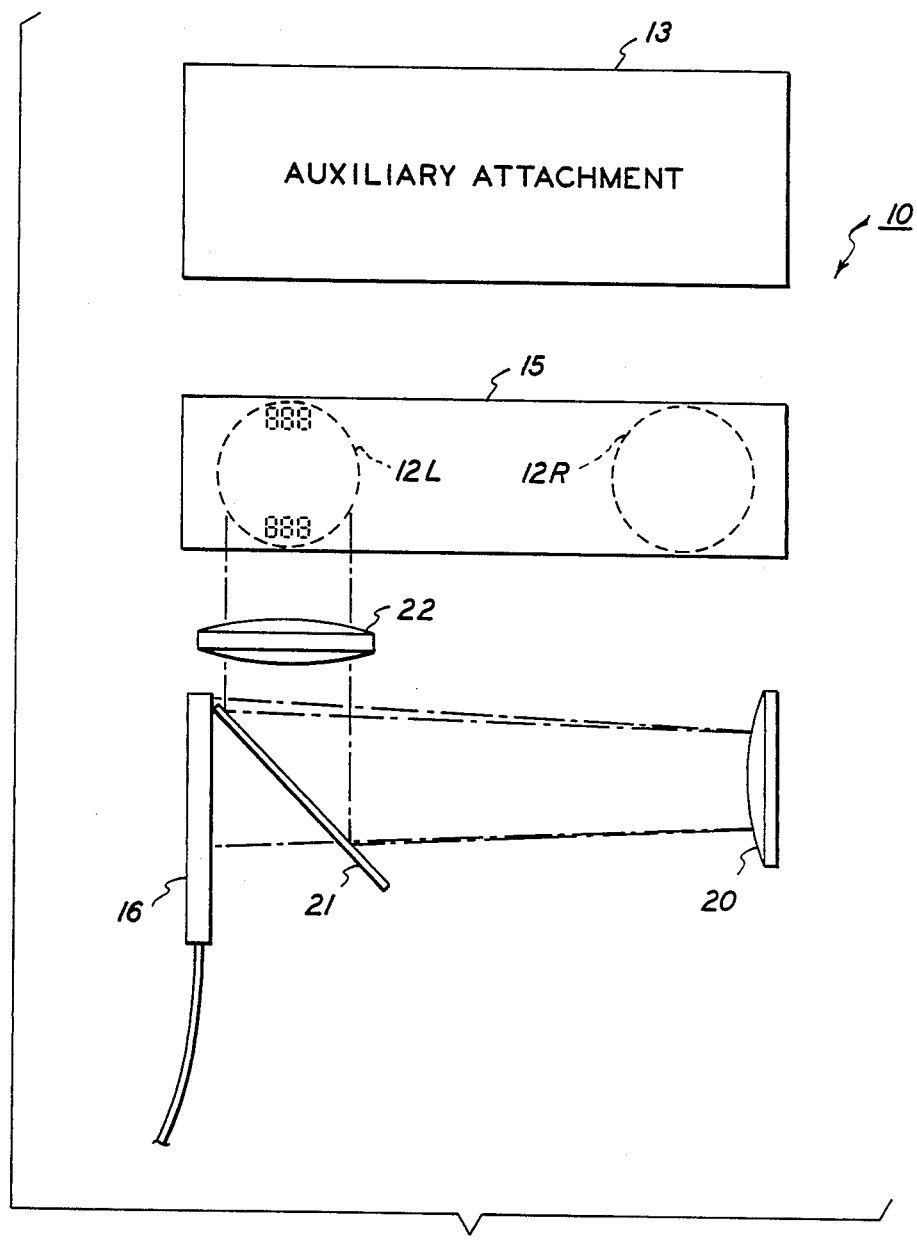

The three reflections of light from digital displays 16 by convex mirror 20, folding mirror 21, and beam splitter 15 dispose images of displays 16a and b respectively at bottom and top marginal regions of the apparent field of left binocular 12L as best shown in FIG. 3. Of course, heads up display images can also be displayed in the apparent field of right binocular 12R, and respective top and bottom images can be reversed.

By such an arrangement, I fit a heads up display compactly within a small space available near beam splitter 15 where it does not take space away from other functions of microscope 10 and its user. My system also optically reduces the image of an electronic digital display to a suitably small size and presents it in a marginal region of the apparent field of one of the binoculars where it can be seen without interferring with the view of the site.

I claim:

1. A heads up display of information relevant to a remote instrument used in association with a microscope having a microscope objective, binoculars, and an essentially collimated light region between said microscope objective and said binoculars, said heads up display comprising:
   a. a beam splitter arranged between said microscope objective and said binoculars;
   b. an electronic digital display of numbers relevant to a control setting for said remote instrument;
   c. said digital display being arranged off the optical axis of said microscope;
   d. a convex mirror arranged for viewing said digital display;
   e. a collimating lens arranged for collimating diverging light from said convex mirror enroute to said beam splitter; and
   f. collimated light from said lens being incident on said beam splitter to position an image of said digital display in a marginal region of the apparent field of one of said binoculars.

2. The heads up display of claim 1 including a pair of said digital displays spaced apart and oriented so that both of said digital displays are viewed by said convex mirror.

3. The heads up display of claim 2 including a folding mirror arranged between said pair of digital displays for directing diverging light from said convex mirror toward said collimating lens.

4. The heads up display of claim 3 wherein images of said pair of said digital displays are disposed at opposite marginal regions of said apparent field.

5. The heads up display of claim 4 wherein said opposite marginal regions are arranged at the top and bottom of said apparent field.

6. The heads up display of claim 1 wherein said collimated light from said lens enters the bottom of said beam splitter and light for an auxiliary attachment exits at the top of said beam splitter.

7. The heads up display of claim 1 wherein said remote instrument is a surgical laser.

8. The heads up display of claim 1 wherein said image of said digital display is viewable in only one of said binoculars.

9. The heads up display of claim 8 wherein said collimated light from said lens enters the bottom of said beam splitter and light for an auxiliary attachment exits at the top of said beam splitter.

10. The heads up display of claim 9 wherein said remote instrument is a surgical laser.

11. The heads up display of claim 10 including a pair of said digital displays spaced apart and oriented so that both of said digital displays are viewed by said convex mirror.

12. The heads up display of claim 11 including a folding mirror arranged between said pair of digital displays for directing diverging light from said convex mirror toward said collimating lens.

13. The heads up display of claim 12 wherein images of said pair of said digital displays are disposed at opposite marginal regions of said apparent field.

14. The heads up display of claim 13 wherein said opposite marginal regions are arranged at the top and bottom of said apparent field.

* * * * *